United States Patent
Ikeya et al.

(10) Patent No.: US 9,466,849 B2
(45) Date of Patent: Oct. 11, 2016

(54) AIR INTAKE DEVICE FOR FUEL CELL VEHICLE

(71) Applicant: SUZUKI MOTOR CORPORATION, Shizuoka (JP)

(72) Inventors: Kengo Ikeya, Shizuoka (JP); Shiro Matsumoto, Shizuoka (JP); Damian Patrick Davies, Nottinghamshire (GB); Nathan Grange, Derbyshire (GB)

(73) Assignee: SUZUKI MOTOR CORPORATION, Shizuoka (JP)

( * ) Notice: Subject to any disclaimer, the term of this patent is extended or adjusted under 35 U.S.C. 154(b) by 174 days.

(21) Appl. No.: 14/365,504

(22) PCT Filed: Mar. 7, 2013

(86) PCT No.: PCT/JP2013/056352
§ 371 (c)(1),
(2) Date: Jun. 13, 2014

(87) PCT Pub. No.: WO2013/141040
PCT Pub. Date: Sep. 26, 2013

(65) Prior Publication Data
US 2015/0004502 A1     Jan. 1, 2015

(30) Foreign Application Priority Data
Mar. 21, 2012    (JP) ................................. 2012-063695

(51) Int. Cl.
*H01M 8/06*     (2016.01)
*H01M 8/04*     (2016.01)
(Continued)

(52) U.S. Cl.
CPC ........ *H01M 8/0687* (2013.01); *B01D 46/0031* (2013.01); *B60L 11/1892* (2013.01);
(Continued)

(58) Field of Classification Search
CPC ............ H01M 8/0687; B60L 11/1892; B60L 11/1898
See application file for complete search history.

(56) References Cited

U.S. PATENT DOCUMENTS

2005/0235615 A1* 10/2005 Nyman .............. B01D 46/0023
                                                         55/350.1
2007/0157815 A1   7/2007 Arai et al.
2008/0248359 A1   10/2008 Kawano et al.

FOREIGN PATENT DOCUMENTS

JP      2002-58943 A     2/2002
JP      2005-203264 A    7/2005
(Continued)

OTHER PUBLICATIONS

The First Office Action mailed Oct. 9, 2015 in corresponding Chinese Patent Application No. 201380008801.6 (13 page).
(Continued)

*Primary Examiner* — Stewart Fraser
(74) *Attorney, Agent, or Firm* — Rothwell, Figg, Ernst & Manbeck, P.C.

(57) ABSTRACT

Provided is a cooling structure for vehicle electrical components that is capable of solving problems due to water contained in intake air. Air used in an electricity generation reaction and air necessary for self-cooling is supplied to a fuel cell stack (11) via an intake duct (2). Dust and chemical substances in the air are removed by a dust/chemical substance filter (3) provided on the fuel cell stack (11) side within the intake duct (2). Furthermore, air and water are primarily separated by a water filter (4) provided in the intake duct (2) upstream by a prescribed distance in the air flow direction from the dust/chemical substance filter (3). Therefore, water in the intake air does not reach the dust/chemical substance filter (3) and the fuel cell stack (11), and various problems due to water contained in the intake air can be solved.

10 Claims, 6 Drawing Sheets

(51) Int. Cl.
  *B60L 11/18* (2006.01)
  *B01D 46/00* (2006.01)
(52) U.S. Cl.
  CPC ...... *B60L11/1898* (2013.01); *H01M 8/04014* (2013.01); *H01M 8/04089* (2013.01); *B01D 46/0023* (2013.01); *B01D 46/0036* (2013.01); *H01M 8/04156* (2013.01); *H01M 2250/20* (2013.01); *Y02E 60/50* (2013.01); *Y02E 60/521* (2013.01); *Y02T 90/32* (2013.01); *Y02T 90/34* (2013.01)

(56) References Cited

FOREIGN PATENT DOCUMENTS

| | | |
|---|---|---|
| JP | 2005-243357 A | 9/2005 |
| JP | 2005-347207 A | 12/2005 |
| JP | 2006-85970 A | 3/2006 |
| JP | 2008-21500 A | 1/2008 |
| JP | 2008-159281 A | 7/2008 |
| JP | 2008-243491 A | 10/2008 |
| JP | 2009-37991 A | 2/2009 |
| JP | 2009-193671 A | 8/2009 |
| JP | 2012-54033 A | 3/2012 |
| WO | 2008-075754 A1 | 6/2008 |

OTHER PUBLICATIONS

International Search Report mailed Jun. 11, 2013 in PCT/JP2013/056352.

Notice of Allowance mailed Aug. 25, 2015 in corresponding Japanese Patent Application No. 2014-506132 (1 page).

* cited by examiner

AIR INTAKE DEVICE FOR FUEL CELL VEHICLE

CROSS REFERENCE TO RELATED APPLICATION

This application is a 35 U.S.C. 371 National Phase Entry Application from PCT/JP2013/056352, filed Mar. 7, 2013, which claims the Japanese Patent Application No. 2012-063695, filed Mar. 21, 2012, the disclosures of which are incorporated herein in their entirety by reference.

TECHNICAL FIELD

The present invention relates to an air intake device for a fuel cell vehicle on which a fuel cell is mounted, and in particular one that is suitable for a vehicle on which an air cooling type fuel cell where a fuel cell is cooled by air is mounted.

BACKGROUND TECHNIQUE

The fuel cell is one that converts a chemical reaction energy of hydrogen and oxygen (oxygen in the air) for example directly into an electric energy. In the fuel cell vehicle, a motor for example is driven by the electric energy obtained in this way, to get a driving force of a vehicle. As such a fuel cell vehicle, there is one that is described in the patent document 1 noted below for example. In this fuel cell vehicle, an air electrode is provided on an outer face of a fuel cell stack equipped with two or more cells, it is made possible to supply air to the fuel cell stack from an intake duct on a vehicle front side, it is made possible to eject an exhaust of the fuel cell stack from an exhaust duct extending to a vehicle rear side, and it is made such that a fan forces the intake air from the intake duct to make contact with the air electrode of the fuel cell stack.

PRIOR ART DOCUMENT

Patent Document

Patent Document 1: Japanese Patent Application publication No. 2009-37991

SUMMARY OF THE INVENTION

Problems to be Solved by the Invention

As a conventional fuel cell for a four wheel vehicle, a water cooling type fuel cell where a fuel cell stack is cooled by cooling water is common. On the other hand, the use of an air cooling type fuel cell where a fuel cell stack is cooled by air is also known. In a fuel cell vehicle that uses an air cooling type fuel cell, the air for cooling the fuel cell stack must also be supplied to the fuel cell stack in addition to the air containing oxygen necessary for a reaction. In the case where an intake duct with a large opening is provided on a vehicle front side of the fuel cell stack in order to intake such a large volume of air, water originating from a rainfall and the like will be supplied to the fuel cell stack along with the intake air. When the water blocks an air flow passage, there is a danger for causing an overheat of the fuel cell. Also, on an air intake portion of the fuel cell stack, usually, a filter for removing dust and chemical substances in the atmosphere is provided. There is a danger for this filter to cause a clogging due to the intake air containing water, such that an intake air resistance increases and it becomes impossible to sufficiently intake the air for the fuel cell stack reaction and the cooling.

The present invention has been made by paying attentions to the problems as noted above, and it is one that has an object to solve various problems that arise as the fuel cell intakes the air containing moisture.

Means for Solving Problems

In order to solve the above noted problems, one form of the invention is, in an air intake device for a fuel cell vehicle that supplies air to be used in an electricity generation reaction to a fuel cell stack through an intake duct, the air intake device for the fuel cell vehicle characterized by having: a first filter provided on a fuel cell stack side within said intake duct, for removing dust and chemical substances in the air; and a second filter provided on an upstream side in an air flow direction at a prescribed distance from the first filter within said intake duct, for primarily separating the air and water.

Also, it is the air intake device for the fuel cell vehicle characterized in that said second filter has a filter material that comprises a non-woven fabric to which a water repellent finishing and a pleating are applied.

Also, it is the air intake device for the fuel cell vehicle characterized in that said first filter has a filter material that is configured by a pair of non-woven fabrics that are pleated and an activated carbon that is sandwiched between these pair of non-woven fabrics.

Also, it is the air intake device for the fuel cell vehicle characterized in that said second filter is rigidly coupled to a vehicle body via said intake duct.

Also, it is the air intake device for the fuel cell vehicle characterized in that a slope portion for leading the water captured by said second filter to an outside of the intake duct is provided at a bottom face on the upstream side in the air flow direction from said second filter of said intake duct.

Also, it is the air intake device for the fuel cell vehicle characterized in that said fuel cell stack is an air cooling type fuel cell stack that is cooled by said air.

Effects of the Invention

Thus, according to one form of the invention, the air to be used in the electricity generation reaction is supplied to the fuel cell stack through the intake duct. The dust and the chemical substances in the air are removed by the first filter provided on the fuel cell stack side within the intake duct. Also, the air and the water are primarily separated by the second filter provided on the upstream side in the air flow direction at the prescribed distance from the first filter within the intake duct. For this reason, the water in the intake air does not reach the first filter and the fuel cell stack side, so that it is possible to solve various problems that arise as the fuel cell intakes the air containing moisture. Also, as the first filter and the second filter are provided individually, it is possible to configure the first filter with the filter material optimal for the separability of the dust and the chemical substances, and to configure the second filter with the filter material optimal for the separability of the water. As a result of that, it is possible to improve both the separability of the water and the separability of the dust and the chemical substances. Also, as the second filter is provided on the upstream side in the air flow direction at the prescribed distance from the first filter, it is possible to suppress the flowing of the water captured by the second filter into the first filter side. Also, it is possible to regulate the flow of the air in the intake duct by the first filter, so that it is possible to improve the electricity generation performance by flowing the air uniformly to the fuel cell stack.

Also, as the filter material of the second filter is configured by the non-woven fabric to which the water repellent finishing and the pleating are applied, it is possible to improve the electricity generation performance at the fuel cell stack by enlarging an airflow area of the second filter.

Also, as the filter material of the first filter is configured by the pair of non-woven fabrics that are pleated and the activated carbon that is sandwiched between these pair of non-woven fabrics, it is possible to separate the chemical substances by the activated carbon while enlarging an airflow area of the first filter. For this reason, it is possible to improve the electricity generation performance at the fuel cell stack.

Also, as the second filter is rigidly coupled to the vehicle body via the intake duct, it is possible to shake off the water captured by the second filter by utilizing the vibrations at a time of the vehicle traveling.

Also, as a slope portion for leading the water captured by the second filter to the outside of the intake duct is provided at the bottom face on the upstream side in the air flow direction from the second filter of the intake duct, it is possible to suppress the flowing of the water captured by the second filter into the first filter side.

Also, in the case where the fuel cell stack is the air cooling type fuel cell stack that is cooled by the air, even if it is the case where a large volume of the air is to be taken into the fuel cell stack, as the water is captured by the second filter, it is possible to avoid various problems that arise as the fuel cell intakes the air containing moisture.

EMBODIMENTS FOR IMPLEMENTING THE INVENTION

Figure 1:
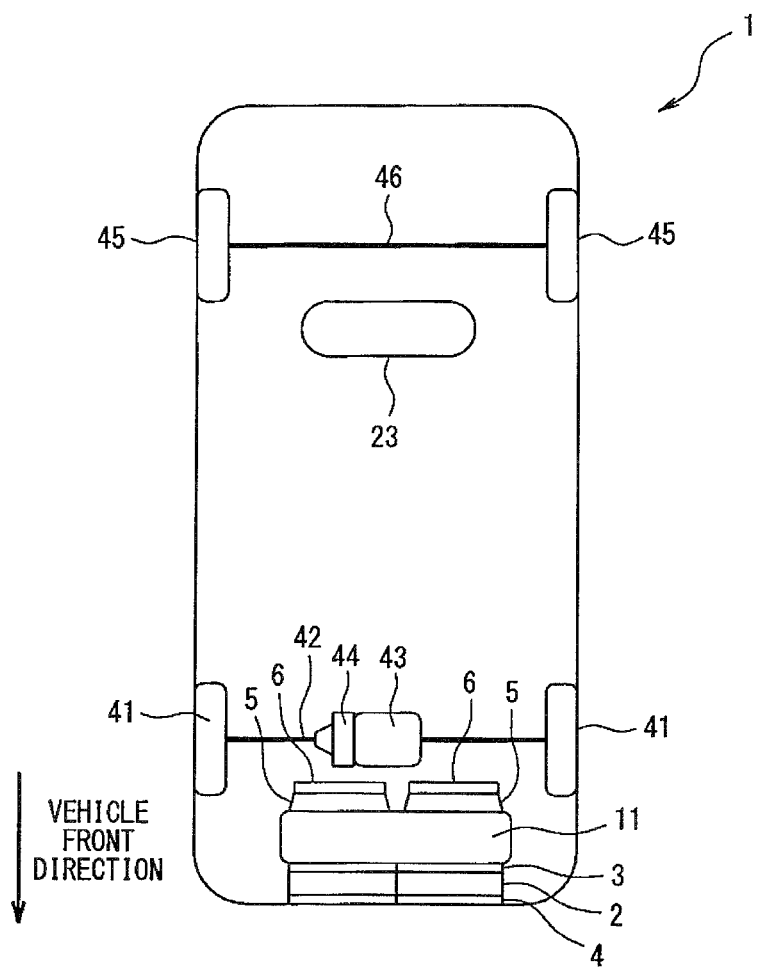
FIG. 1 It is a plan view of a fuel cell vehicle showing one embodiment of an air intake device for a fuel cell vehicle of the present invention.
Figure 6:
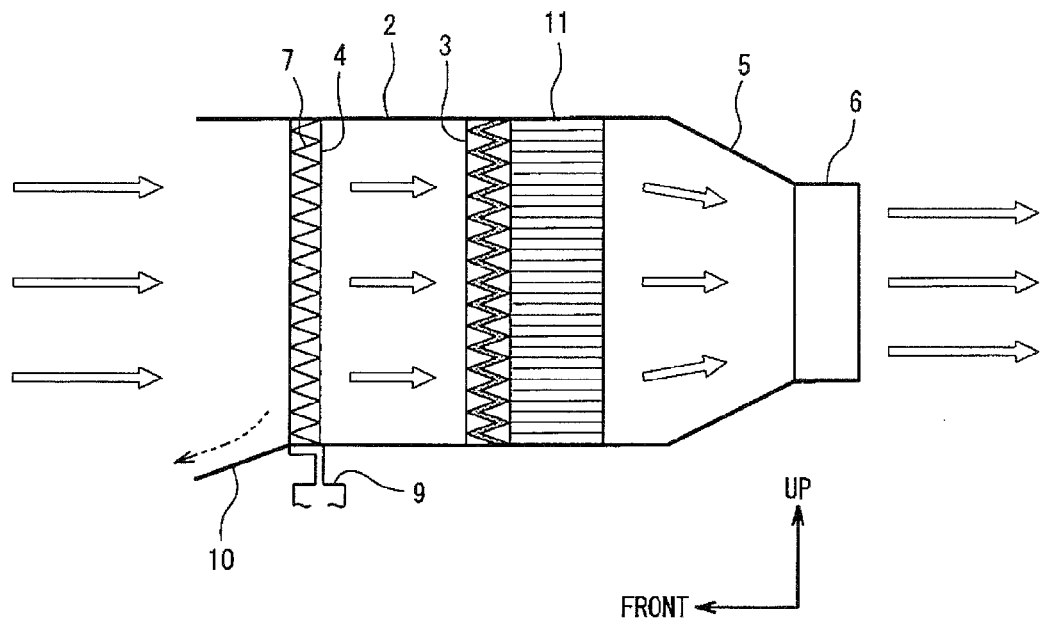
FIG. 6 It is a longitudinal cross sectional view of a fuel cell stack and an air intake device of FIG. 1.

Next, one embodiment of an air intake device for a fuel cell vehicle of the present invention will be described with references to the drawings. FIG. 1 is a plan view of a fuel cell vehicle to which an air intake device of the present embodiment is applied. In this fuel cell vehicle 1, a motor 43 for driving and a gear box 44 of a transmission are arranged in a vicinity of an axle 42 of front wheels 41 that are to become driving wheels. On a front side portion of the vehicle, a fuel cell stack 11 is mounted. Also, on a rear side portion of the vehicle, in a vicinity of an axle 46 of rear wheels 45, a hydrogen tank 23 is arranged. The present embodiment adopts an air cooling type fuel cell stack in which the fuel cell stack 11 is cooled by the air. On a vehicle front side of the fuel cell stack 11, an intake duct 2 is attached, and on a vehicle rear side of the fuel cell stack 11, an exhaust duct 5 is attached. On a vehicle rear side end portion of the exhaust duct 5, a low pressure fan 6 such as a blower is provided. As shown in FIG. 6, on the fuel cell stack 11 side within the intake duct 2, a dust/chemical substance filter (a first filter) 3 for removing dust and chemical substances in the air is provided. Also, on an upstream side in an air flow direction, that is a front side, at a prescribed distance from the dust/chemical substance filter 3 within the intake duct 2, a water filter (a second filter) 4 for primarily separating the air and the water is provided.

Figure 2:
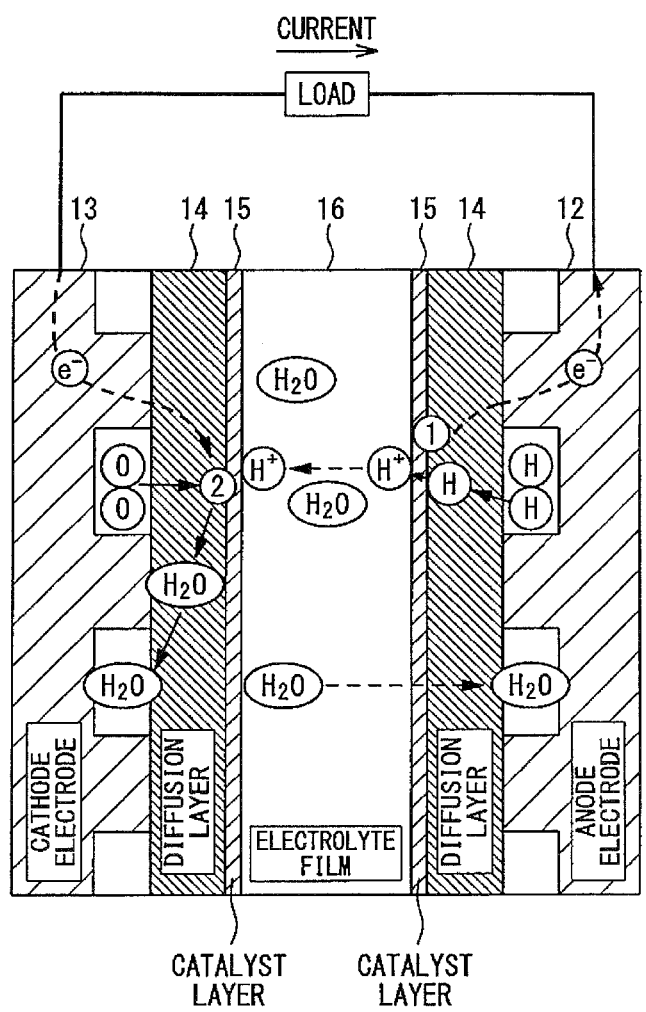
FIG. 2 It is an explanatory figure for a cell of a fuel cell stack.

Before the description of the air intake device for the fuel cell vehicle of the present embodiment, a hydrogen fuel cell that is adopted in the present embodiment will be described. The fuel cell stack 11 is configured by laminating a multiplicity of minimum constituent units called cells. One example of a cell is shown in FIG. 2. In the ordinary solid polymer type fuel cell, each cell is equipped with an anode electrode 12 to which hydrogen is supplied, a cathode electrode 13 to which oxygen (air) is supplied, an electrolyte film 16 arranged between the anode electrode 12 and the cathode electrode 13 for selectively transmitting hydrogen ions, catalyst layers 15 arranged on both outer sides of the electrolyte film 16 for activating reaction, and diffusion layers 14 sandwiched between respective catalyst layer 15 and the anode electrode 12 or the cathode electrode 13.

The hydrogen molecules supplied to the anode electrode 12 will be turned into active hydrogen atoms at the catalyst layers 15 present on an electrolyte surface of the anode electrode 12, and further turned into hydrogen ions to emit electrons. This reaction which is indicated by "1" in FIG. 2 is expressed by the following equation (1).

$$H_2 \rightarrow 2H^+ + 2e^- \tag{1}$$

The hydrogen ions generated according to the equation (1) will move through the electrolyte film 16 from the anode electrode 12 side to the cathode electrode 13 side, along with the moisture contained in the electrolyte film 16, and also the electrons will move to the cathode electrode 13 through an external circuit. The oxygen molecules in the air that are supplied to the cathode electrode 13 on one side will be turned into oxygen ions by receiving the electrons supplied from the external circuit at the catalyst layers 15, and turned into the water by being bonded with the hydrogen ions that have moved through the electrolyte film 16. This reaction which is indicated by "2" in FIG. 2 is expressed by the following equation (2). Also, a portion of the moisture generated in this way will move from the cathode electrode 13 to the anode electrode 12 by the concentration diffusion. Note that the exhaust from the anode electrode 12 will also be denoted as an anode exhaust, and the exhaust from the cathode electrode 13 will also be denoted as a cathode exhaust.

$$1/2 O_2 + 2H^+ + 2e^- \rightarrow H_2O \tag{2}$$

Figure 3:
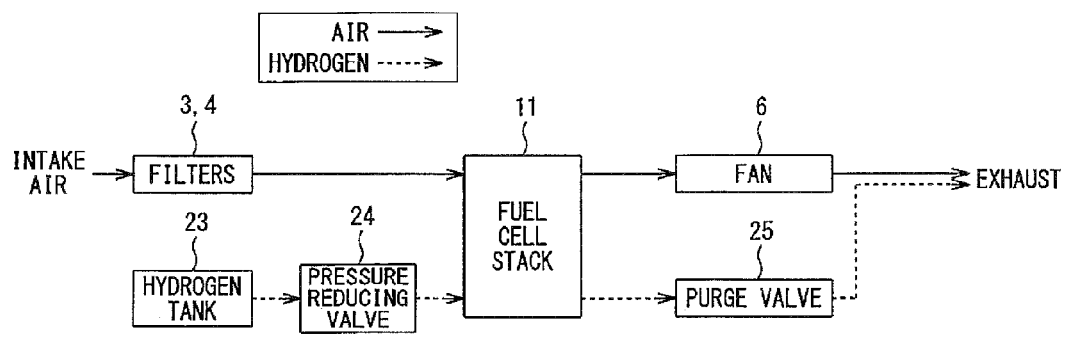
FIG. 3 It is a block diagram of a fuel cell system of FIG. 1.

In such a chemical reaction, various losses will occur inside the fuel cell such as a resistance overvoltage caused by resistances of the electrolyte film 16 and the electrodes, an activation overvoltage due to the electrochemical reaction caused by the hydrogen and the oxygen, and a diffusion overvoltage due to the movement of the hydrogen and the oxygen in the diffusion layers 14, and there is a need to cool the fuel cell stack 11 that is heated by these. FIG. 3 is a block diagram of a fuel cell system of the present embodiment. The fuel cell system of the present embodiment is an air cooling type fuel cell system. The fuel cell stack 11 receives the supply of the air by the fan 6 via the filters 3 and 4 mentioned above. The supplied air is not only used in the electricity generation reaction at the fuel cell stack 11 but also serving for cooling the fuel cell stack 11. Note that, to the fuel cell stack 11, it may be made possible to supply the air by the traveling wind rather than just the supply of the air by the fan 6. On the other hand, the hydrogen inside the hydrogen tank 23 is supplied to the fuel cell stack 11 after a pressure is lowered by a pressure reducing valve 24. Then, the hydrogen that is not used in the electricity generation will be ejected from the fuel cell stack 11 as the anode exhaust. The anode exhaust (the exhaust of the hydrogen supply side) is merged with the cathode exhaust (the exhaust of the air supply side) via a purge valve 25. At a time of purging the anode exhaust, the exhaust hydrogen gas is diluted to be less than or equal to the flammable lower limit concentration by the cathode exhaust (air) and discharged to the external.

Figure 4:
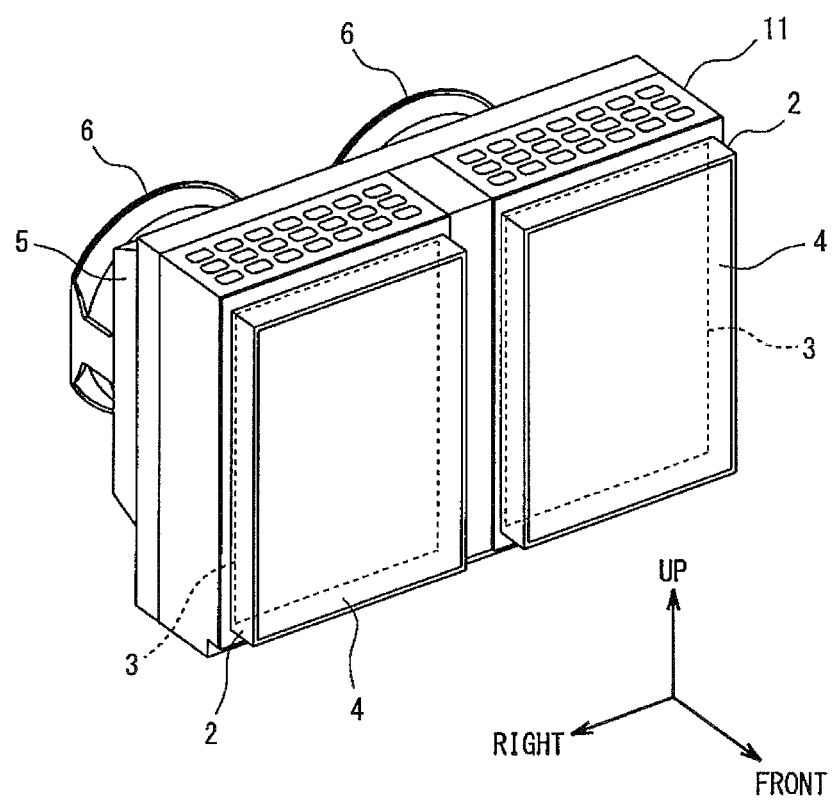
FIG. 4 It is a perspective view in which a fuel cell stack and an air intake device of FIG. 1 are viewed from a diagonally right front side of a vehicle.
Figure 5:
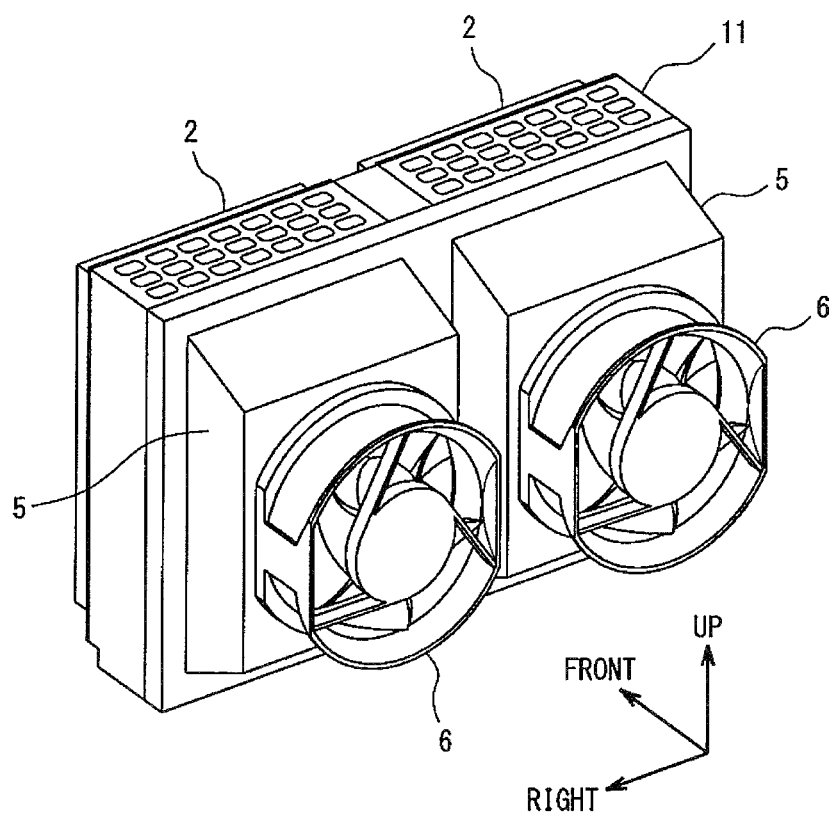
FIG. 5 It is a perspective view in which a fuel cell stack and an air intake device of FIG. 1 are viewed from a diagonally left rear side of a vehicle.

FIG. 4 is a perspective view in which the fuel cell stack 11 and the air intake device of the present embodiment are viewed from a diagonally right front side of the vehicle, FIG. 5 is a perspective view in which the fuel cell stack 11 and the air intake device of the present embodiment are viewed from a diagonally left rear side of the vehicle, and FIG. 6 is a longitudinal cross sectional view of the fuel cell stack 11 and the air intake device of the present embodiment. In the present embodiment, as mentioned above, the dust/chemical substance filter 3 is provided on the fuel cell stack 11 side within the intake duct 2, and the water filter 4 is provided on a front side at a prescribed distance from the dust/chemical substance filter 3 within the intake duct 2.

Figure 7:
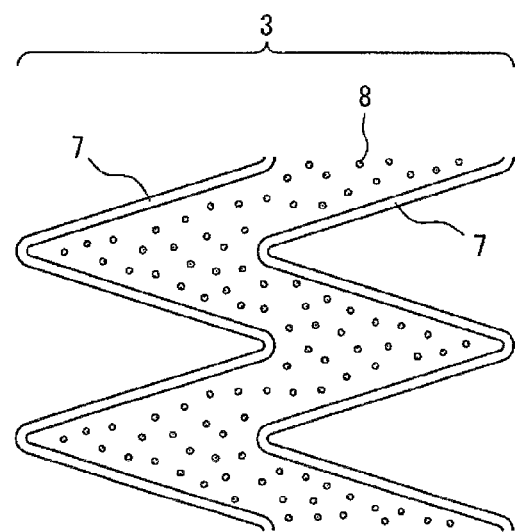
FIG. 7 It is a longitudinal cross sectional view of a filter material of a second filter.

The filter material of the dust/chemical substance filter 3 is configured by having a pair of non-woven fabrics 7 that are pleated and an activated carbon 8 that is sandwiched between these pair of non-woven fabrics 7, as shown in FIG. 7. Primarily, the non-woven fabrics 7 are aimed at the removal of the dust, and the activated carbon 8 is aimed at the removal of the chemical substances. Also, in the present embodiment, the dust/chemical substance filter 3 is provided to be directly mounted at an air intake portion of the fuel cell stack 11. In this way, a filter opening area is secured and a regulation effect for the air intake into the fuel cell stack 11 is exhibited. In this way, it contributes to the down-sizing of the fuel cell system, while the air supply to each cell within the fuel cell stack 11 becomes uniform so that it is possible to suppress the irregularity of the temperature among the cells.

The water filter 4 is rigidly coupled to a vehicle body 9 such that a filtering surface is facing to a vehicle front side direction and is in a vertical direction. The filter material of the water filter 4 comprises a non-woven fabric 7 to which a water repellent finishing is applied, and it is applied with a pleating in order to secure an airflow area. For the water repellent finishing, one for coupling silicone, resin wax, fluorine compound to fibers, or one for coating polyurethane resin can be enumerated, as is well known. This water filter 4 is primarily aiming at the separation of the air and the water in the air, but it also removes foreign substances of large particle diameters, and supplies the air without moisture to the dust/chemical substance filter 3 and the fuel cell stack 11. In the present embodiment, the water filter 4 has a filtering surface that is in the vertical direction, so that a water captured by the water filter 4 will flow down over a surface of the filter material.

Also, as the water filter 4 is rigidly coupled to the vehicle body 9, the water captured by the water filter 4 will be shaken off by the vibrations of the vehicle body 9. Also, in the present embodiment, a slope portion 10 for leading the water captured by the water filter 4 to an outside of the intake duct 2 is provided at a bottom face on an upstream side in an air flow direction, that is a front side, from the water filter 4 of the intake duct 2. Because of the presence of this slope portion 10, the water that has flown down along the vertical filtering surface of the water filter 4 or the water that has been shaken off by the vibrations of the vehicle body 9 will flow down to a vehicle front side, and will not flow into the intake duct 2.

As such, in the air intake device for the fuel cell vehicle of the present embodiment, the air to be used in the electricity generation reaction is supplied to the fuel cell stack 11 through the intake duct 2. The dust and the chemical substances in the air are removed by the dust/chemical substance filter (the first filter) 3 provided on the fuel cell stack 11 side within the intake duct 2. Also, the air and the water are primarily separated by the water filter (the second filter) 4 provided on the upstream side in the air flow direction at the prescribed distance from the dust/chemical substance filter 3 within the intake duct 2. For this reason, the water in the intake air does not reach the dust/chemical substance filter 3 and the fuel cell stack 11 side, so that it is possible to solve various problems that arise as the fuel cell intakes the air containing moisture. Also, as the dust/chemical substance filter 3 and the water filter 4 are provided individually, it is possible to configure the dust/chemical substance filter 3 with the filter material optimal for the separability of the dust and the chemical substances, and to configure the water filter 4 with the filter material optimal for the separability of the water. As a result of that, it is possible to improve both the separability of the water and the separability of the dust and the chemical substances. Also, as the water filter 4 is provided on the upstream side in the air flow direction at the prescribed distance from the dust/chemical substance filter 3, it is possible to suppress the flowing of the water captured by the water filter 4 into the dust/chemical substance filter 3 side. Also, it is possible to regulate the flow of the air in the intake duct 2 by the dust/chemical substance filter 3, so that it is possible to improve the electricity generation performance by flowing the air uniformly to the fuel cell stack.

Also, as the filter material of the water filter 4 is configured by the non-woven fabric to which the water repellent finishing and the pleating are applied, it is possible to improve the electricity generation performance at the fuel cell stack 11 by enlarging an airflow area of the water filter 4.

Also, as the filter material of the dust/chemical substance filter 3 is configured by the pair of non-woven fabrics 7 that are pleated and the activated carbon 8 that is sandwiched between these pair of non-woven fabrics 7, it is possible to separate the chemical substances by the activated carbon 8 while enlarging an airflow area of the dust/chemical substance filter 3. For this reason, it is possible to improve the electricity generation performance at the fuel cell stack 11.

Also, as the water filter 4 is rigidly coupled to the vehicle body 9 via the intake duct 2, it is possible to shake off the water captured by the water filter 4 by utilizing the vibrations at a time of the vehicle traveling.

Also, as a slope portion 10 for leading the water captured by the water filter 4 to the outside of the intake duct 2 is provided at the bottom face on the upstream side in the air flow direction from the water filter 4 of the intake duct 2, it is possible to suppress the flowing of the water captured by the water filter 4 into the dust/chemical substance filter 3 side.

Also, as in the case where the fuel cell stack 11 is the air cooling type fuel cell stack that is cooled by the air, even if it is the case where a large volume of the air is to be taken into the fuel cell stack 11, as the water is captured by the water filter 4, it is possible to avoid various problems that arise as the fuel cell intakes the air containing moisture.

Note that the air intake device for the fuel cell vehicle of the present invention is applicable to the fuel cell vehicle in general, but it is particularly effective for the air cooling type fuel cell stack in which a large volume of the air supply is necessary not only for the reaction of the fuel cell stack but also for its cooling, and therefore a reduction of an airflow resistance in the air intake and exhaust system is required.

EXPLANATION OF REFERENCE NUMERALS

1 is a fuel cell vehicle
2 is an intake duct
3 is a dust/chemical substance filter
4 is a water filter
5 is an exhaust duct
6 is a fan
7 is a non-woven fabric
8 is an activated carbon
9 is a vehicle body
10 is a slope portion
11 is a fuel cell stack
12 is an anode electrode
13 is a cathode electrode
14 is a diffusion layer
15 is a catalyst layer
16 is an electrolyte film
23 is a hydrogen tank
24 is a pressure reducing valve
25 is a purge valve
41 is a front wheel
42 is an axle
43 is a motor
44 is a gear box
45 is a rear wheel
46 is an axle

The invention claimed is:

1. An air intake device for supplying air to be used in an electricity generation reaction within a fuel cell vehicle comprising:
    an air duct;
    a fuel cell stack;
    the air intake device
        a water filter rigidly coupled to a vehicle body of the fuel cell vehicle and configured to separate air and water, the water filter having a filtering surface within the air duct, the filtering surface extending in a vertical direction with respect to the vehicle body; and
        a dust/chemical substance filter within the air duct and downstream, with respect to air flowing through the air duct, of the water filter and spaced from the water filter by a predetermined distance, the dust/chemical substance filter being configured to remove dust and chemical substances in the air within the air duct.

2. The air intake device as recited in claim 1, wherein the water filter has a filter material that includes a non-woven fabric having a water repellent finishing and a pleated configuration.

3. The air intake device as recited in claim 1, wherein the dust/chemical substance filter has a filter material that is configured by a pair of non-woven fabrics that are pleated and an activated carbon that is sandwiched between the pair of non-woven fabrics.

4. The air intake device as recited in claim 1, wherein a slope portion for leading the water captured by the water filter to an outside of the intake duct is provided at a bottom face on the upstream side in the air flow direction from the filtering surface of the water filter within the air duct.

5. The air intake device as recited in claim 1, wherein the fuel cell stack is an air cooling type fuel cell stack that is cooled by the air in the air duct.

6. The air intake device as recited in claim 1, wherein the water filter rigidly coupled to the vehicle body is configured and arranged such that vibrations of the vehicle body shake off water captured by the water filter.

7. The air intake device according to claim 1, wherein:
    the water filter rigidly coupled to the vehicle body is configured and arranged such that vibrations of the vehicle body shake off water captured by the water filter; and
    the air intake device further includes a slope portion positioned at a bottom of the water filter, and wherein the slope portion extends on an upstream side of the water filter with respect to the air flow direction, and wherein the slope portion is sloped downwardly and arranged to guide water filtered by the water filter outside of the intake duct.

8. The air intake device according to claim 7, wherein the water filter comprises a first filter material and the dust/chemical substance filter comprises a second filter material different from the first filter material.

9. The air intake device according to claim 8, wherein the first filter material comprises a non-woven fabric having a water repellant finishing, and the second material comprises a pair of non-woven fabrics with an activated carbon between the pair of non-woven fabrics.

10. The air intake device according to claim 9, wherein:
    the water filter is positioned within the air duct at an upstream side of the air duct;
    the dust/chemical substance filter is positioned within the air duct at a downstream side of the air duct;
    the fuel cell stack is positioned downstream of the dust/chemical substance filter; and
    a fan is positioned downstream of the fuel cell stack.

* * * * *